(12) United States Patent
Hoff et al.

(10) Patent No.: US 7,462,970 B2
(45) Date of Patent: Dec. 9, 2008

(54) POWER SYSTEM

(75) Inventors: Brian D. Hoff, East Peoria, IL (US);
Marcelo C. Algrain, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 241 days.

(21) Appl. No.: 10/740,519

(22) Filed: Dec. 22, 2003

(65) Prior Publication Data

US 2005/0134046 A1 Jun. 23, 2005

(51) Int. Cl.
*H02K 47/04* (2006.01)
(52) U.S. Cl. .......................... 310/113; 310/74
(58) Field of Classification Search ............ 310/74, 310/153, 112–114; 322/4; 290/1 A; 180/65.1–62.4
See application file for complete search history.

(56) References Cited

U.S. PATENT DOCUMENTS

| | | | | |
|---|---|---|---|---|
| 3,140,413 A * | 7/1964 | Terry et al. | ............ | 310/168 |
| 5,773,904 A * | 6/1998 | Schiebold et al. | ............ | 310/92 |
| 6,018,199 A * | 1/2000 | Shiroyama et al. | ......... | 290/37 A |
| 6,394,924 B1 | 5/2002 | Schiebold et al. | ............ | 475/5 |
| 6,409,623 B1 * | 6/2002 | Hoshiya et al. | ............ | 475/5 |
| 6,571,895 B2 | 6/2003 | Weimer | ............ | 180/65.1 |
| 6,769,389 B2 * | 8/2004 | Tamai et al. | ............ | 123/179.3 |
| 2002/0104499 A1* | 8/2002 | Sanada et al. | ............ | 123/179.3 |
| 2003/0197384 A1* | 10/2003 | Vuk | ............ | 290/38 R |

* cited by examiner

*Primary Examiner*—Dang D Le
(74) *Attorney, Agent, or Firm*—Finnegan, Henderson, Farabow, Garrett & Dunner

(57) ABSTRACT

A power system includes an engine, a motor/generator operatively connected to the engine, and a starter operatively connected to at least one of the engine and the motor/generator.

23 Claims, 3 Drawing Sheets

POWER SYSTEM

U.S. GOVVERNMENT RIGHTS

This invention was made with government support under the terms of Contract No. DE-F004-2000AL6701 7 awarded by the Department of Energy. The government may have certain rights in this invention.

TECHNICAL FIELD

The present invention relates generally to a power system, and more particularly to a power system having a starter and a motor/generator.

BACKGROUND

Work machines, including on-highway vehicles, have an engine for powering the work machine. The engine may be a diesel engine, a gasoline engine, a natural gas engine, or any other type of engine known in the art. The engine produces torque to power the work machine, and likewise requires torque to start the engine.

The torque required to start the engine may be generated with a starting system. For example, U.S. Pat. No. 5,773,904 (the '904 patent) issued to Schiebold et al. on Jun. 30, 1998, describes an electric machine used to start an internal combustion engine. The electric machine includes a motor/generator having a stator and an external rotor. The motor/generator is installed in the drive train of a motor vehicle with a hybrid drive and configured to apply a starting torque to the drive train.

Although the electric machine of the '904 patent may be used to start an internal combustion engine, the motor/generator of the '904 patent may be large and expensive. In addition, the electric machine of the '904 patent may not have a control system that allows for efficient operation of the motor/generator during a starting sequence.

The present invention is directed to overcoming one or more of the problems set forth above.

SUMMARY OF THE INVENTION

In one aspect, the present disclosure is directed to a power system that includes an engine. A motor/generator is operatively connected to the engine. A starter is operatively connected to at least one of the engine and the motor/generator.

In another aspect, the present disclosure is directed to a method of starting an engine. The method includes actuating a starter to apply torque to an engine, and actuating a motor/generator to apply torque to the engine.

DETAILED DESCRIPTION

Figure 1:
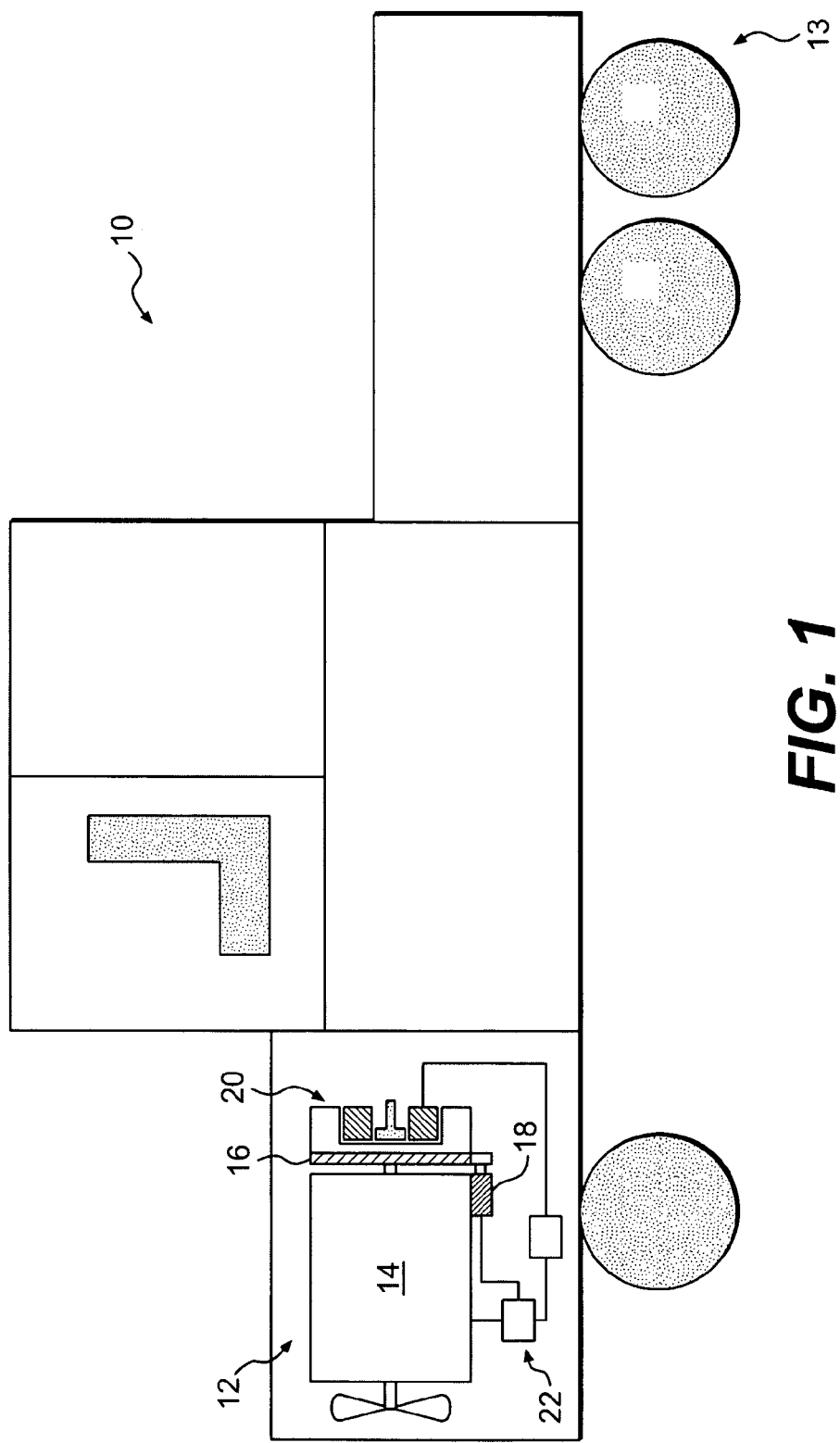
FIG. 1 is a diagrammatic illustration of a work machine 10 including a power system in accordance with an exemplary embodiment of the present invention.

FIG. 1 illustrates a work machine 10 having an exemplary embodiment of a power system 12 and a traction device 13. Power system 12 may include an engine 14 having a flywheel 16, a starter 18, a motor/generator 20, and a control system 22.

Figure 2:
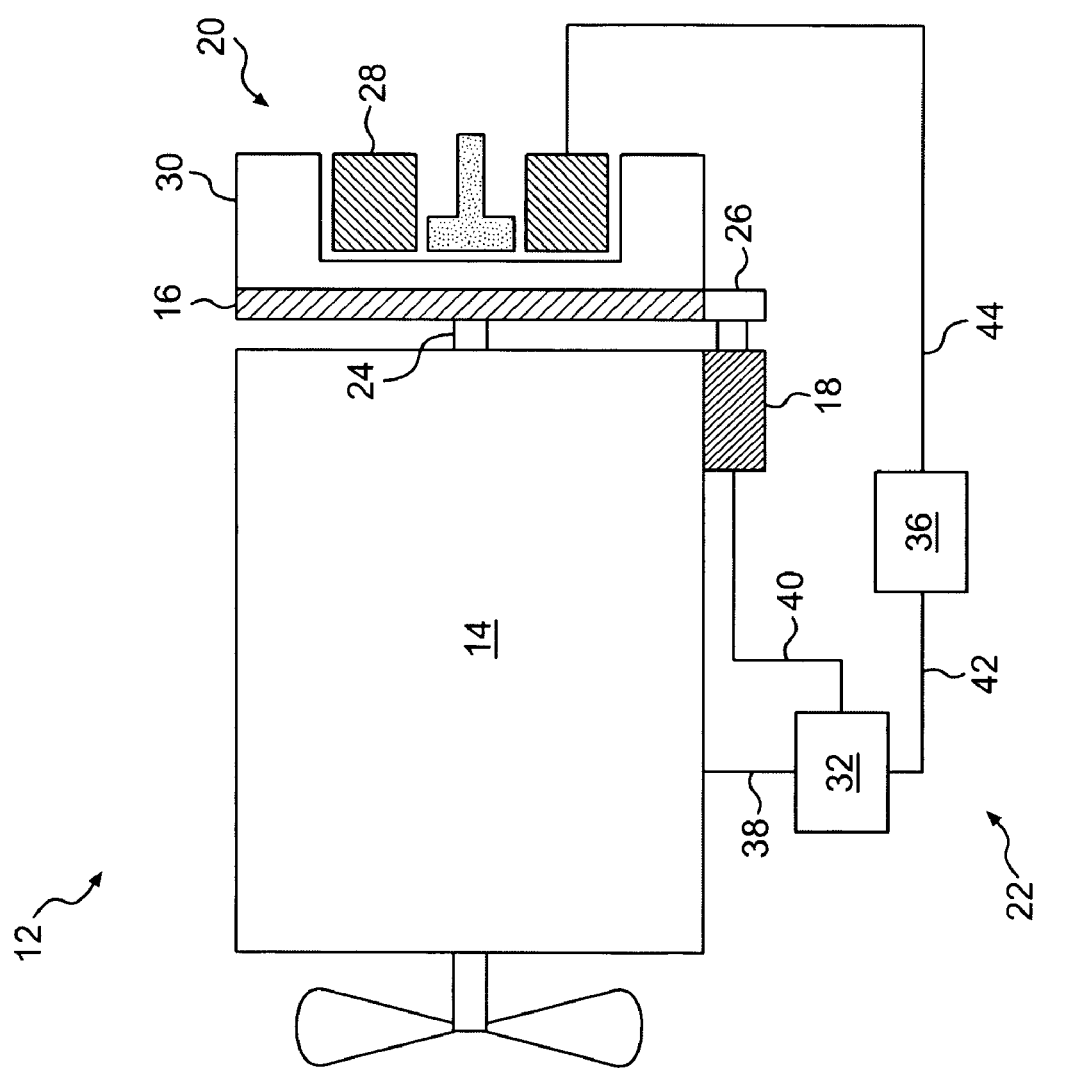
FIG. 2 is a diagrammatic illustration of a power system in accordance with an exemplary embodiment of the present invention.
Figure 3:
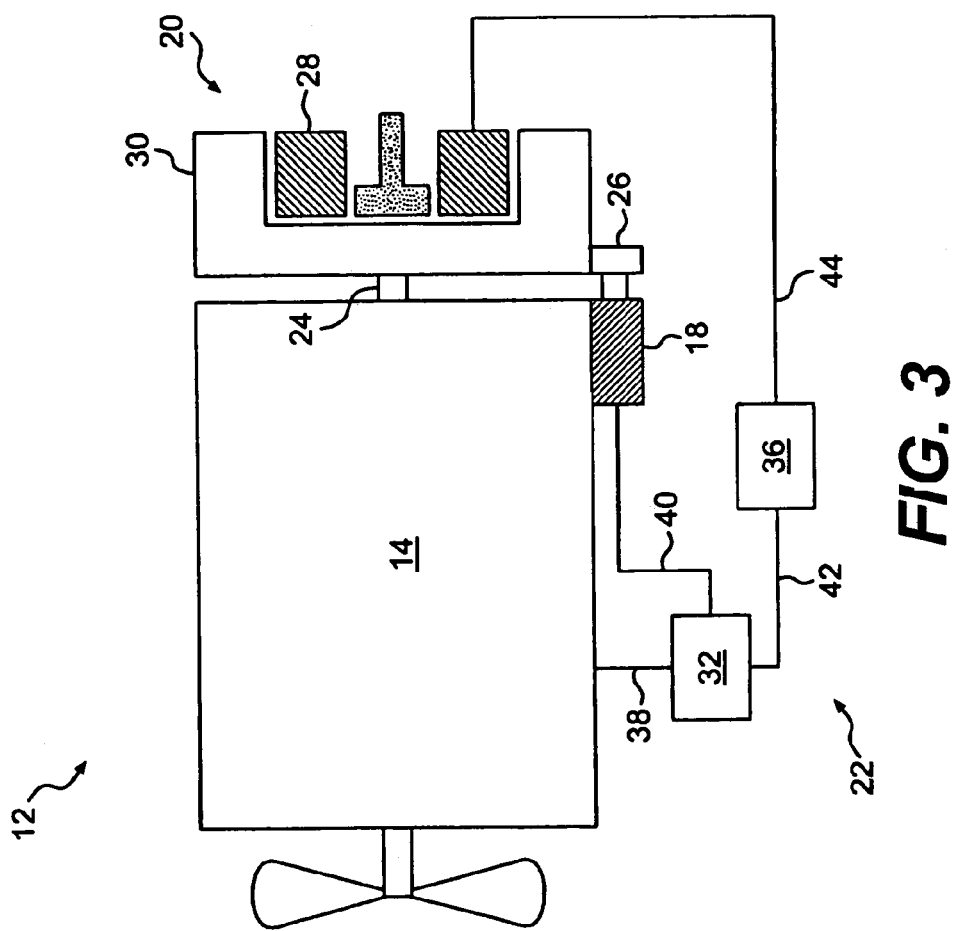
FIG. 3 is a diagrammatic illustration of a power system in accordance with an exemplary embodiment of the present invention.

As illustrated in FIG. 2, flywheel 16 may be connected to engine 14. For example, flywheel 16 may be connected to a crankshaft 24 of engine 14, or in any other manner known in the art. Flywheel 16 may be any type of device for storing and releasing rotational energy to dampen transient loads placed on or exerted by engine 14. For example, flywheel 16 may be a fixed inertia flywheel, a variable inertia flywheel, an electric flywheel, or any other flywheel known in the art. In addition, the flywheel may include multiple rotating masses. It is also contemplated that flywheel 16 may be absent from engine 14 and that motor/generator 20 may act as a means for storing and releasing rotational inertia.

Starter 18 may be connected to engine 14 by engaging a pinion gear 26 of starter 18 with external gear teeth (not shown) of flywheel 16. Starter 18 may also be connected to engine 14 in other ways. For example, starter 18, may engage pinion gear 26 with a gear (not shown) fixed to crankshaft 24, or in any other way known in the art. Starter 18 may also directly engage motor/generator 20 in the system where flywheel 16 is absent. Starter 18 may be any device for applying torque sufficient to rotate crankshaft 24 causing one or more pistons (not shown) to reciprocate within one or more cylinders (not shown) of engine 14, such as an electric starter, a pneumatic starter, a hydraulic starter, or any other device known in the art.

Motor/generator 20 may be a single unit configured to selectively operate as a motor applying torque to engine 14, or as a generator driven by engine 14 to produce electrical power. Motor/generator 20 may include a fixed stator 28, and an external rotor 30 configured to rotate about stator 28. Alternately, stator 28 may be configured to be external to rotor 30. As described above, motor/generator 20 may store and release rotational inertia from and to engine 14. In particular, rotor 30 may have sufficient mass and/or be controlled to dampen transient power loads placed on or exerted by engine 14.

Control system 22 may include a controller 32. Controller 32 may include components such as, for example, a memory, a secondary storage device, a processor, and any other components for controlling power system 12. Furthermore, although aspects of the present disclosure may be described as being stored in memory, these aspects can also be stored on or read from other types of computer related devices or computer-readable media, such as computer chips and secondary storage devices, including hard disks, floppy disks, CD-ROM, or other forms of RAM or ROM. Various other known circuits may be associated with controller 32 such as, for example, power supply circuitry, signal conditioning circuitry, solenoid driver circuitry, and other appropriate circuitry. In addition, the function of controller 32 may extend beyond controlling the starting operation of engine 14. For example, controller 32 may also operate as a main engine controller or other engine system controller that controls various functions of engine 14 in addition to the starting operation.

Control system 22 may further include a drive inverter 36. Drive inverter 36 may have various components including insulated gate bipolar transistors (IGBTs), microprocessors, capacitors, memory storage devices, and any other components that may be used for operating motor/generator 20.

Controller 32 may be in communication with engine 14, starter 18, drive inverter 36, and motor/generator 20. Specifically, controller 32 may communicate with engine 14 via a communication line 38, with starter 18 via a communication line 40, and with drive inverter 36 via a communication line 42. Controller 32 may also communicate with motor/generator 20 through drive inverter 36 and a communication line 44.

INDUSTRIAL APPLICABILITY

The present invention may be applicable to any power system having an engine in which starting assistance would be beneficial. In particular, typical applications utilizing a motor/generator size the motor/generator according to the maximum torque required to start an engine under all conditions. Sizing a motor/generator in this manner could produce wasted power while operating in generating mode, which may add unnecessary component cost and parasitic load on the engine. Power system 12 may allow for a reduction in the size of the motor/generator used to start the engine, because a second starter is used in conjunction with the motor/generator. Power system 12 may also reduce fuel consumption, reduce emissions, and extend the life of the engine 14.

The operation of power system 12 will now be discussed. As described above, engine 14 may require the application of torque to cause crankshaft 24 to rotate during a starting operation. The size of motor/generator 20 needed to start engine 14 may increase with respect to the amount of torque required to rotate crankshaft 24.

The torque required to rotate crankshaft 24 at a particular time may also be proportional to the speed of crankshaft 24. When crankshaft 24 is stopped, a large amount of torque may be required to initiate rotation of crankshaft 24. Conversely, when already rotating above a predetermined speed, less torque may be required to keep crankshaft 24 rotating and/or to accelerate crankshaft 24.

A large motor/generator 20 may be problematic in some situations. Specifically, a large motor/generator 20 may be difficult to package in some applications and may be costly. In addition, a large motor/generator 20 may be inefficient and reduce design flexibility of systems that interact with motor/generator 20. The use of starter 18 in conjunction with motor/generator 20 may allow motor/generator 20 to be a smaller size, operate efficiently, and still provide sufficient torque to start engine 14.

Starter 18 may be used in conjunction with motor/generator 20 during a starting sequence when a speed of engine 14 is below a predetermined speed. The predetermined speed may be determined through lab and/or field testing, and may depend on the type of engine, the application, and various other factors known in the art. The predetermined speed may be selected from one of a number of predetermined speeds kept in a look-up table within a memory of controller 32. Controller 32 may be configured to receive a signal from engine 14 indicative of engine speed.

In a start-up sequence consistent with the disclosed embodiment, starter 18 may be used to provide torque to crankshaft 24 sufficient to initiate rotation of crankshaft 24. Starter 18 may be actuated and/or caused to engage flywheel 16 to rotate flywheel 16 up to the predetermined speed. Starter 18 may then be disengaged from flywheel 18, deactivated, or may continue to add torque throughout the starting sequence. When the speed of the engine reaches the predetermined engine speed, motor/generator 20 may be activated to apply torque to crankshaft 24 of engine 14. It is also contemplated that motor/generator 20 may apply torque throughout the starting sequence and not only activated by a triggering speed of the engine. When engine 14 is operational (e.g., when controller 32 determines that engine speed is above a predetermined threshold), motor/generator 20 may be caused to stop adding torque to engine 14 to conclude the starting sequence.

The use of both starter 18 and motor/generator 20 during the starting sequence of engine 14 may allow for a quicker, more efficient start-up of engine 14. A quicker start-up may reduce fuel consumption and emissions, and extend the life of engine 14.

It will be apparent to those skilled in the art that various modifications and variations can be made to power system of the present disclosure without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A power system, comprising:
    an engine;
    a motor/generator operatively connected to the engine; and
    a starter operatively connected to at least one of the engine and the motor/generator;
    wherein the starter and motor/generator are each configured to apply torque to the engine to initiate rotation of the crankshaft as a function of a sensed speed of the crankshaft and to continue to apply torque to the engine throughout a starting sequence.

2. The power system of claim 1, further including:
    a flywheel operatively connected to the engine,
    wherein the motor/generator includes:
        a rotor operatively connected to the flywheel; and
        a stator rotatably disposed within the rotor.

3. The power system of claim 2, wherein the starter is configured to engage the rotor.

4. The power system of claim 1, further including:
    a flywheel operatively connected to the engine,
    wherein the starter is configured to engage the flywheel.

5. The power system of claim 4, wherein the starter is configured to be selectively disengaged from the engine when the speed of the engine is above a predetermined value.

6. The power system of claim 1, wherein the starter is further configured to selective cease application of torque to the engine when a speed of the engine is above a perdetermined value.

7. The power system of claim 1, further including a controller in communication with at least one of the motor/generator, the starter, and the engine, the controller operable to deactivate the starter during the starting sequence when the speed of the engine is above a predetermined level.

8. A method of starting an engine, comprising:
    initially actuating a starter and a motor/generator to apply torque to an engine to initiate rotation of a crankshaft as a function of a sensed speed of the crankshaft;
    continuing to actuate the motor/generator to apply torque to the engine when a speed of the engine is above a predetermined value and before completion of the starting sequence; and
    ceasing to actuate the starter to apply torque to the engine when the speed of the engine is above the predetermined value.

9. The method of claim 8, further including ceasing to actuate the motor/generator to apply torque to the engine when the engine is operational.

10. The method of claim 9, wherein when the engine is operational, the starting sequence is concluded.

11. A machine, comprising:
a traction device;
an engine configured to power the traction device;
a flywheel operatively connected to the engine;
a motor/generator including a rotor directly connected to the flywheel and a stator rotatably disposed within the rotor;
a starter operatively connected to at least one of the engine and the motor/generator; and
wherein the starter and motor/generator are configured to apply torque to the engine to initiate rotation of a crankshaft as a function of a sensed speed of the crankshaft.

12. The machine of claim 11, wherein:
the starter and motor/generator are configured to apply torque to the engine during a starting sequence of the engine when a speed of the engine is below a predetermined value; and
the motor/generator is configured to apply torque to the engine without the starter during the starting sequence of the engine when the speed of the engine is above the predetermined value.

13. The machine of claim 11, wherein the starter is configured to engage the rotor.

14. The machine of claim 11, wherein the starter is configured to engage the flywheel to apply torque to the engine.

15. The machine of claim 14, wherein the starter is configured to disengage the flywheel to cease applying torque to the engine when the speed of the engine is above a predetermined value during a starting sequence.

16. The machine of claim 11, wherein the motor/generator is configured to cease applying torque to the engine when the engine is operational.

17. The machine of claim 11, further including a controller in communication with at least one of the motor/generator, the starter, and the engine, the controller operable to deactivate the starter when the speed of the engine is above a predetermined value.

18. A power system, comprising:
an engine;
a first means for starting the engine, wherein the first means for starting is configured to generate power when the engine is running; and
a second means for starting the engine;
wherein the first and second means for starting the engine are configured to apply torque to the engine to initiate rotation of a crankshaft as a function of a sensed speed of the crankshaft and continue to apply torque to the engine throughout a starting sequence.

19. The power system of claim 18, further including:
a flywheel operatively connected to the engine,
wherein the second means for starting is configured to engage the flywheel.

20. The power system of claim 18, wherein the first means for starting is a motor/generator and the second means for starting is a starter, the starter being in engagement with the motor/generator.

21. The power system of claim 18, wherein the second means for starting is configured to selectively cease application of torque to the engine when a speed of the engine is above a predetermined value during the starting sequence.

22. The power system of claim 18, wherein the first and second means for starting are configured to cease application of torque to the engine when the engine is operational.

23. The power system of claim 18, further including a means for controlling at least one of the first means for starting, the second means for starting, and the engine, the means for controlling operable to deactivate the second means for starting to cease application of torque to the engine when the speed of the engine is above a predetermined level.

* * * * *